United States Patent [19]
Green

[11] Patent Number: 5,505,514
[45] Date of Patent: Apr. 9, 1996

[54] CAMPER/TRAILER COMBINATION

[76] Inventor: George M. Green, 17543 Hooper Rd., Greenwell Springs, La. 70739

[21] Appl. No.: 328,564

[22] Filed: Oct. 24, 1994

Related U.S. Application Data

[63] Continuation of Ser. No. 121,151, Sep. 13, 1993, abandoned.

[51] Int. Cl.⁶ ..................................................... B60P 3/367
[52] U.S. Cl. ........................ 296/157; 296/158; 280/414.1; 114/344
[58] Field of Search .................................. 296/157, 158; 280/414.1, 47.331; 114/344

[56] References Cited

U.S. PATENT DOCUMENTS

| | | | |
|---|---|---|---|
| D. 268,101 | 3/1993 | Pope et al. | D12/104 |
| 3,224,019 | 12/1965 | Guomundson | 114/344 |
| 3,380,607 | 4/1968 | Dale | 296/157 X |
| 3,556,582 | 1/1971 | Bledsoe . | |
| 3,563,596 | 2/1971 | Davis | 296/158 |
| 3,649,064 | 3/1972 | Bledsoe . | |
| 3,651,969 | 3/1972 | Bledsoe . | |
| 3,751,073 | 8/1973 | Alexander . | |
| 3,885,693 | 5/1975 | Haptonstall | 296/157 X |
| 4,188,056 | 2/1980 | Watson | 296/157 |
| 4,781,392 | 11/1988 | Cooper | 280/414.1 |
| 4,872,719 | 10/1989 | Cardwell | 410/116 X |
| 4,923,243 | 5/1990 | Drahos | 296/157 |
| 5,005,846 | 4/1991 | Taylor | 114/344 X |
| 5,069,471 | 12/1993 | VanDerLinden | 280/414.1 |
| 5,072,963 | 12/1991 | Avillez | 296/157 X |
| 5,234,308 | 8/1993 | Mann | 296/61 X |

*Primary Examiner*—Dennis H. Pedder
*Attorney, Agent, or Firm*—John M. Harrison

[57] ABSTRACT

A camper/trailer combination including an anterior camper having bedspace, kitchenspace and livingspace, mounted on a wheeled frame which includes a posterior boat or utility trailer. The combination is suitably adapted for towing by a pickup truck, automobile or other vehicle which has a conventional bumper or "gooseneck" trailer hitch mechanism. In one embodiment the utility trailer is adapted for carrying a boat and in another embodiment the utility trailer is modified to define a utility trailer for all terrain vehicles, bicycles, motorcycles and the like.

3 Claims, 2 Drawing Sheets

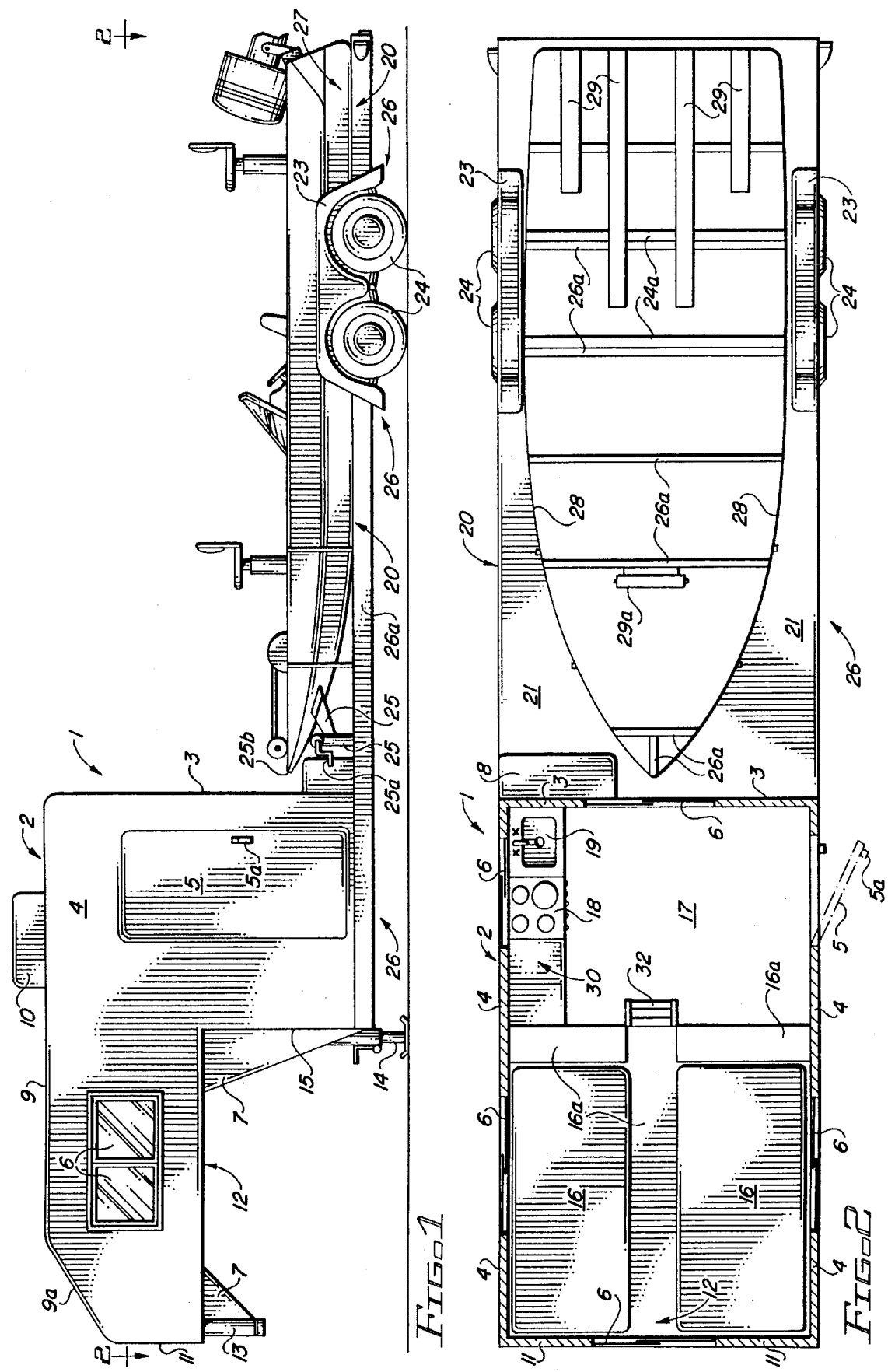

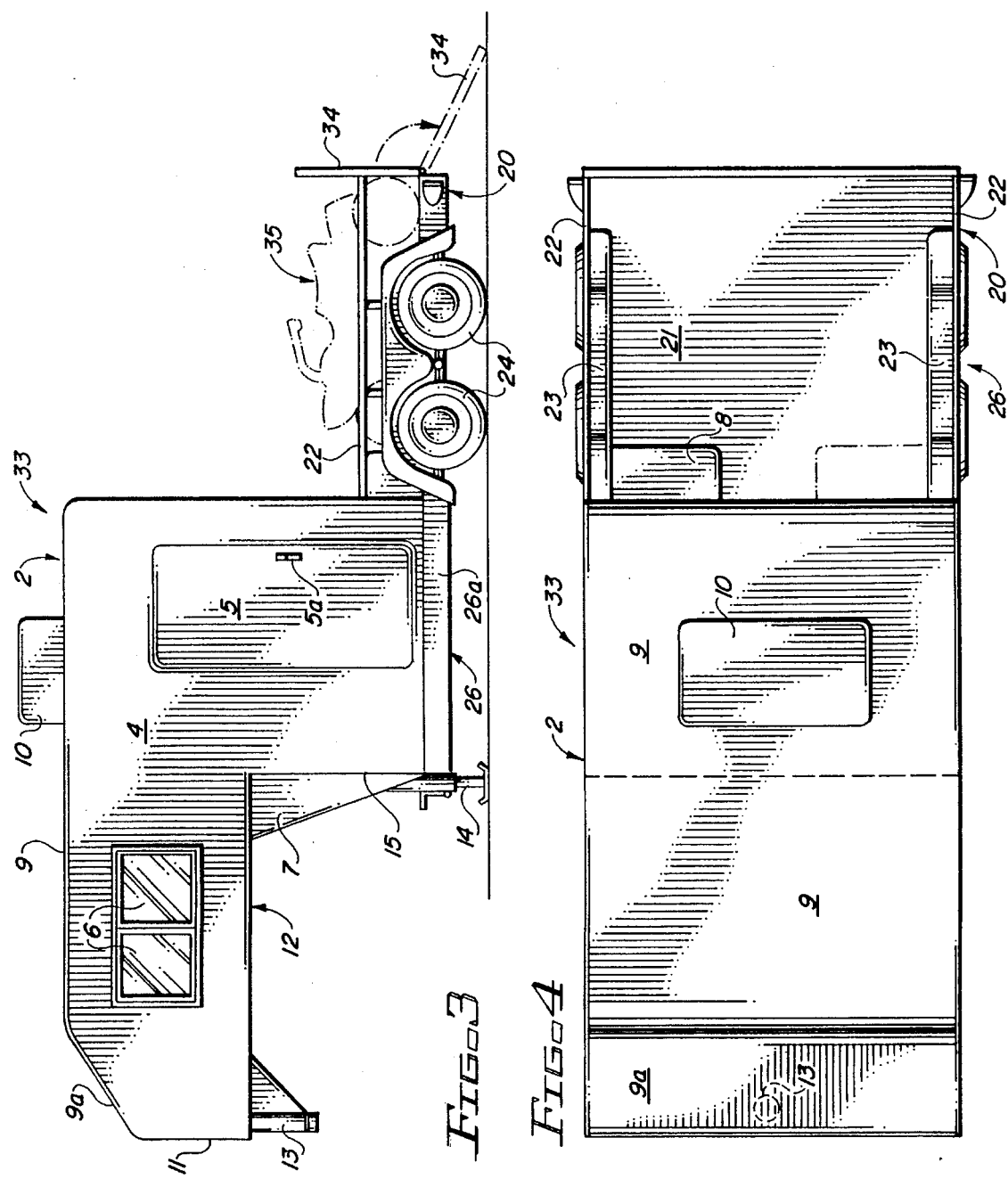

CAMPER/TRAILER COMBINATION

This is a continuation of copending application Ser. No. 08/121,151 filed on Sep. 13, 1993, now abandoned.

BACKGROUND OF THE INVENTION

1. Field of the Invention

This invention relates to campers, boat trailers and utility trailers and more particularly, to a camper/trailer combination, including a camper which is mounted on the anterior portion of a wheel-mounted frame coupled to a towing vehicle and a trailer which is integrally provided on the posterior portion of the frame. The camper of the camper/trailer combination includes a door for accessing the camper interior, one or more windows provided in one or more walls of the camper in addition to storage, bedspace, kitchenspace and livingspace. A hitch receptacle is provided on the anterior end of the camper/trailer frame to engage a conventional ball mechanism mounted on the rear of a towing vehicle. In one embodiment the posterior trailer portion of the camper/trailer combination is suitably shaped and adapted for carrying and easily accessing a boat and is provided with a pedestal and winch system which utilizes a conventional crank mechanism and winch line for launching and securing the boat on the trailer. In another embodiment the posterior trailer portion of the camper/trailer combination is shortened and modified to define a utility trailer which includes a rectangular panel pivoted to the rear edge of the trailer and defining a ramp for removing items from the trailer when angled downwardly from the rear edge of the trailer and acting as a tailgate when angled upwardly from the rear edge of the trailer.

One of the problems with conventional campers and boat or utility trailers is that of providing a camper of comfortable size and accommodations, with the capacity to launch and secure a boat, ATV, motorcycle or other sports vehicle. Conventional campers are typically mounted on the beds of pickup trucks and are therefore limited in size, to facilitate conveniently towing a boat. Larger campers and recreational vehicles are difficult to maneuver and manage when towing a boat, particularly during the boat launching process. Furthermore, large boats are typically difficult to access when loaded on a trailer, without climbing into the boat, to retrieve or store gear and supplies.

The camper/trailer combination of this invention is designed to provide convenience and flexibility for camping, recreational vehicle, sports vehicle and fishing enthusiasts. By providing a camper with convenient storage, bedspace and kitchenspace on a frame which also serves as a boat and utility trailer, the need for a motel or other lodging during fishing trips is obviated and the possibility of having the boat, motorcycle or all terrain vehicle stolen during the night is lessened. Furthermore, the camper/trailer design of this invention facilitates easy boat and bicycle, motorcycle, ATV or other sports vehicle loading and unloading, as well as convenient access when loaded.

2. Description of the Prior Art

Various apparatuses have been devised to carry items such as boats, bicycles, motorcycles and all terrain vehicles (ATV) in combination with a house or camper. U.S. Pat. No. 3,380,607, dated Apr. 30, 1968, to C. E. Dale, describes "Transport Equipment" which is characterized by a wheel-carried frame having an anterior enclosure with storage and livingspace and a posterior boat trailer, with an adjustable tilting member for raising the front of a carried boat to load the boat into a lake. The anterior part of the frame has a hitch for engaging a hitch mechanism on a flat-bed pickup truck. U.S. Pat. No. 3,556,582, dated Jan. 19, 1971, to S. H. Bledsoe, discloses a "House and Boat Trailer Apparatus" including a frame which is supported by wheels and is adapted for carrying a boat anteriorly and a camper mounted on the frame posterior to the boat-carrying portion of the frame. Approximately the anterior half of the camper is mounted on supports and overlaps the posterior half of the boat-carrying portion of the frame. The apparatus includes a hitch to allow towing by a truck or car. U.S. Pat. No. 3,649,064, dated Mar. 14, 1972, to Sherman H. Bledsoe, details a "Combination House and Auxiliary Trailer Apparatus", including an anterior auxiliary trailer and a posterior house trailer which is mounted on a common frame with the auxiliary trailer. The frame is supported on wheels and includes a forwardly-projecting tongue and hitch mechanism for connection to a towing vehicle at one end and a rearwardly-projecting tongue for alternative connection to a towing vehicle at the opposite end. U.S. Pat. No. 3,651,969, dated Mar. 28, 1972, to Sherman H. Bledsoe, discloses a "Combination House and Auxiliary Trailer Apparatus", including a frame carried on two pairs of wheels and a main closure mounted thereon. A pair of spaced tracks project rearwardly from the main closure and an extendible closure is carried thereon for telescopal receipt in the main closure. An auxiliary trailer is provided with a rear portion that is receivable between the tracks and includes a pair of support wheels and a retraction device for retracting the support wheels to an elevated position. A coupling mechanism is provided for coupling the auxiliary trailer to the rear portion of the house trailer. U.S. Pat. No. 3,751,073, dated Aug. 7, 1973, to William M. Alexander and Lawrence J. Stancik, details a "Method and Apparatus For Towing Trailers" which includes a frame, a first hitch disposed near the front end of the frame to connect the frame to a towing vehicle and a second hitch located near the rear end of the frame to connect the frame to a trailer. A support which is laterally mounted on the frame is adapted to hold the axle of the trailer being piggybacked. U.S. Pat. No. 4,188,056, dated Feb. 12, 1980, to Charles L. Watson, describes a "Combination Boat and Camper Trailer" characterized by an upper camper-supporting portion secured to a lower boat-supporting portion. The camper-supporting portion includes opposed pairs of parallel, inclined guide members supporting the camper for movement between upper and lower positions. U.S. Pat. No. Des. 268,101, dated Mar. 1, 1983, to Owen H. Pope and David W. Gibbard, illustrates and describes a "Combination Boat, Camper and Utility Trailer". U.S. Pat. No. 4,923,243, dated May 8, 1990, to Michael W. Drahos, discloses a "Trailer Transport Device" having an auxiliary frame structure attachable to the front end of a house trailer for supporting a boat or small automobile. U.S. Pat. No. 5,069,471, dated Dec. 3, 1991, to James A. Van Der Linden and John J. Van Der Linden, details a "Travel and Utility Trailer Combination" characterized by a house trailer with a wheel-mounted main frame which has two spaced side beams extending rearwardly thereof and supports a main closure or house. An auxiliary trailer is hitched to a portion of the main frame positioned between the side beams and side beam extensions are pivoted to the ends of the side beams, which are raised by a hydraulic linear motor to lift the auxiliary trailer wheels off the ground during travel.

It is an object of this invention to provide a new and improved camper/trailer combination characterized by a frame which supports an anteriorly-mounted camper having a door, a window or windows, storage facilities, bedspace, livingspace, and kitchenspace, which frame also includes a posterior wheel-mounted trailer suitably adapted for carrying a boat in one embodiment and a utility trailer with an adjustable tailgate in another embodiment.

Another object of the invention is to provide a camper/boat trailer combination which is characterized by a self-contained camper enclosure and boat trailer mounted on a common towable frame, with a boat cavity shaped in a boat-supporting area of the frame to accommodate the boat and a platform provided in the frame adjacent to the boat cavity to facilitate easily accessing the boat while the boat is on the boat trailer.

SUMMARY OF THE INVENTION

These and other objects of this invention are provided in a new and utilitarian camper/trailer combination which includes a camper enclosure having bedspace, livingspace, kitchenspace and storage on the front end of a trailer frame and a utility/boat trailer facility provided in the opposite or rear end of the non-articulating trailer frame for accommodating a boat or an ATV, bicycle(s), motorcycle or the like, with a boat support platform having a boat-receiving cavity in one variation and a pivoting tailgate-ramp in another variation, the trailer frame adapted for towing by a vehicle.

BRIEF DESCRIPTION OF THE DRAWINGS

The invention will be better understood by reference to the accompanying drawings, wherein:

FIG. 1 is a side view of a preferred embodiment of the camper/trailer combination of this invention in a camper-boat trailer configuration;

FIG. 2 is a sectional view of the camper/trailer combination taken along section line 2—2 in FIG. 1, with the boat removed for brevity;

FIG. 3 is a side view of a utility trailer embodiment of the camper/trailer combination of this invention; and FIG. 4 is a top view of the utility trailer embodiment of the camper/trailer combination illustrated in FIG. 3.

DESCRIPTION OF THE PREFERRED EMBODIMENTS

Referring initially to FIGS. 1 and 2 of the drawings, in a first preferred embodiment the camper/trailer combination of this invention is designed to support a boat 27 and is generally illustrated by reference numeral 1. The camper/trailer combination 1 includes an enclosure which defines a camper 2, mounted on the front or anterior portion of a non-articulating camper/trailer frame 26. The camper 2 includes a floor 17, supported by the camper/trailer frame 26, which floor 17 supports a rectangular rear wall 3 of selected height, extending upwardly from the rear edge of the floor 17. A roof 9 is supported by the rear wall 3 and parallel side walls 4, which extend upwardly from each of the two lateral edges of the floor 17 and mounts an air conditioning/heating unit 10 for heating or cooling the camper interior, as required. A sloped roof segment 9a angles downwardly from the front edge of the roof 9 to rest on the upper edge of a front wall 11. A bed panel 12 which supports a bed or beds 16, originates anteriorly along the bottom edge of the front wall 11 and extends rearwardly, parallel to the roof 9. A crawl space and storage compartment 16a is provided beneath the bed panel 12 and additional storage compartments 16a are provided at the foot of each of the beds 16, as illustrated in FIG. 1. The rear edge of the bed panel 12 linearly contacts the upper edge of a vertical tailgate panel 15, which is perpendicular to both the bed panel 12 and the floor 17 and a ladder 32 extends from the floor, 17 to the bed panel 12. The front edge of the floor 17 linearly contacts and supports the lower edge of the tailgate panel 15. A gusset 7 extends between the horizontal bed panel 12, and the vertical tailgate panel 15 for support purposes. A door 5, including a door knob or latch 5a, is hingedly mounted within one of the side walls 4 and a window 6 is also mounted in one of the side walls 4 above the bed panel 12. A second window 6 is provided in the front wall 11, as illustrated in FIG. 2. As further illustrated in FIG. 2 a cabinet 30, provided with cabinet doors 31, is mounted on the floor 17 against the side wall 4 which is opposite the door 5. A stove 18, located adjacent to a sink 19, is provided in the top of the cabinet 30. A downwardly-extendable support leg 14 is mounted on each side of the anterior or forward end of the camper/trailer frame 26, for maintaining the floor 17 in an elevated position, parallel to the ground when the camper/trailer combination is not coupled to a towing vehicle (not illustrated). An elongated, tubular hitch receptacle 13 extends downwardly from substantially the lateral midpoint of the front wall 11 at the elevated front of the camper 2 and is stiffened by means of a gusset 7, as illustrated in FIG. 1.

The posterior, or trailer portion of the camper/trailer combination 1 is generally illustrated by reference numeral 20 and includes a flat platform 21, extending around the entire periphery of the trailer portion as illustrated in FIG. 2, which may be carpeted and is mounted on the frame members 26a at the posterior end of the camper/trailer frame 26. Two sets of axles 24a, mounting wheels 24, are secured to the trailer 20 of the camper/trailer frame 26 and a wheel housing 23 encloses the upper portions of the wheels 24. A boat hitch pedestal 25 which mounts a winch 25b, provided with a crank 25a, a brace 25c and a winch line (not illustrated) connected to the boat 27, is included near the front edge of the platform 21 for removably securing the boat 27 to the trailer 20. A boat cavity 28, shaped in the outline of the bottom edge of the boat 27 as illustrated in FIG. 2, is provided in the platform 21 for accessing the boat 27. Four spaced, padded boat supports 29, substantially paralleling the longitudinal dimension of the trailer 20, and a roller 29a, provide support for the secured boat 27. A generator 8 is mounted on the front of the platform 21 against the rear wall 3 of the camper 2, for supplying power to the camper 2.

Referring now to FIGS. 3 and 4 of the drawings, in a second preferred embodiment of the invention a camper/utility trailer combination is generally illustrated by reference numeral 33 and includes the camper 2, as described above with respect to FIGS. 1 and 2, mounted on the anterior portion of a camper/trailer frame 26. The posterior portion of the camper/trailer frame 26 is characterized by a trailer 20, supported on two sets of wheels 24, housed in wheel housings 23, mounted on each lateral edge of the trailer 20 and a guard rail 22 spans the sides of the trailer 20. A ramp panel 34 includes a longitudinal edge hingedly fastened to the rear edge of the trailer 20 of the camper/trailer frame 26, the ramp panel 34 defining a ramp (illustrated in phantom in FIG. 3) when the ramp panel 34 is pivoted to the lowermost position and a tailgate when pivoted to the vertical position also illustrated in FIG. 3. Accordingly, a motorcycle or ATV 35 (illustrated in phantom in FIG. 3) can be easily loaded and unloaded on and from the trailer 20 of the camper/trailer frame 26 by manipulating the ramp panel 34.

It will be appreciated by those skilled in the art that the camper/trailer combination of this invention is superior to conventional camper and boat or ATV-motorcycle-utility trailer combinations because of the various features described above. The camper/trailer combination is easily maneuvered to load and unload a boat, bicycle(s), ATV or motorcycle and yet provides all of the amenities and comfort necessary for an extended stay away from home. For example, referring to FIGS. 1 and 2 of the drawings, a boat 27 can be quickly and easily loaded on the camper/trailer frame 2 in the boat cavity 28 and resting on the boat supports 29 and roller 29a without previously unloading or storing supplies, tackle and equipment. Final storing and unloading of any such supplies, tackle and gear can be quickly, easily and efficiently accomplished while standing on the flat platform 21, which substantially surrounds the boat and allows ready access to the boat interior.

Similarly, referring to FIGS. 3 and 4 of the drawings, the motorcycle or ATV 35 in the camper/utility trailer combination 33 is easily accessed and loaded or unloaded by pivotally manipulating the ramp panel 34 to the travel, or "up" position or unloading (down) position.

While the preferred embodiments of the invention have been described and set forth with the particularity outlined above, it will be recognized and understood that various other embodiments of the invention may be included and the invention is limited only by the appended claims.

Accordingly, what is claimed is:

1. A camper and boat trailer combination for receiving and carrying a boat and towing by a vehicle, said camper and boat trailer combination comprising a substantially rigid frame; a camper enclosure mounted on one end of said frame; a boat support defined by the opposite end of said frame from said one end; wheels provided on said boat support; a platform mounted on said boat support, said platform extending from said camper enclosure to said opposite end of said frame and said platform including a downwardly open boat cavity with substantially straight rear edge tapering to a front curved bow shape, for removably receiving the boat when the boat is positioned on said boat support, said platform further defining a walking support around the entire periphery of said boat cavity; a "gooseneck" type trailer hitch receptacle extending downwardly from said one end of said frame at said camper to the vehicle; and a winch provided on said platform for removably securing the boat to said trailer in said boat cavity, whereby said camper and said trailer are towed by the vehicle with the boat in place on said trailer.

2. The camper and boat trailer of claim 1 wherein said platform extends continuously from said camper enclosure around said boat cavity to the stern of the boat for accessing the boat when the boat is on said boat support.

3. The camper and boat trailer of claim 2 wherein said winch is mounted on said platform forward of said boat cavity.

* * * * *